United States Patent [19]
Schuster

[11] Patent Number: 5,382,479
[45] Date of Patent: Jan. 17, 1995

[54] ADVANCED STACKED MULTICELL THERMAL BATTERY

[75] Inventor: Nicholas Schuster, Madison, Ohio

[73] Assignee: Westinghouse Electric Corporation, Pittsburgh, Pa.

[21] Appl. No.: 137,337

[22] Filed: Oct. 18, 1993

[51] Int. Cl.[6] .......................................... H01M 10/39
[52] U.S. Cl. .................................. 429/112; 429/120
[58] Field of Search ............................... 429/112, 120

[56] References Cited

U.S. PATENT DOCUMENTS

| | | | |
|---|---|---|---|
| 3,899,353 | 8/1975 | Tomita | 429/112 |
| 4,044,192 | 8/1977 | Bowser et al. | 429/112 |
| 4,087,591 | 5/1978 | Bowers et al. | 429/112 X |
| 4,596,752 | 6/1986 | Faul et al. | 429/112 X |
| 4,675,257 | 6/1987 | Winchester | 429/112 |
| 4,954,403 | 9/1990 | Plichta et al. | 429/103 |

Primary Examiner—Stephen Kalafut

[57] ABSTRACT

An improved multicell battery of the type heated to an operating temperature and having a plurality of battery cells stacked in series. Each cell having an anode and a cathode which are separated from one another by a separator. Both the anode and the cathode contain an electrolyte that is liquid at the operating temperature. The improvements include providing a pyrotechnic heat source around the outer periphery of each cell. Insulation is preferably provided around the cells. The preferred insulations are compressed foil and peg foil. The separators are preferably made of aluminum nitride. Cobalt disulfide is the preferred cathode material.

14 Claims, 1 Drawing Sheet

ADVANCED STACKED MULTICELL THERMAL BATTERY

BACKGROUND OF THE INVENTION

1. Field of the Invention

This invention relates to improvements in stacked multicell thermal batteries, and more particularly to increasing power and longevity in stacked multicell batteries used under high rate conditions such as in sonobuoy systems.

2. Description of the Prior Art

Future thrusts in the sohobuoy area call for active sonobuoys, i.e., buoys with sufficient power to send out an acoustic signal to a target, receiving the return signal that has bounced from the target and actively searching for the location of the target rather than just listening passively. Because an active search and locate mode is required, active buoys must employ a power source capable of providing high power pulses ranging from several hundred watts to as much as 1 kW or higher. Pulse durations may vary and duty cycles (percent of the time the battery is pulsing) can vary from low values of 10% to conceivably approaching 100%.

Because the both volume and the weight of the sonobuoy must be minimized and the battery itself should be quiet, a thermal type battery is a possible choice. Unfortunately, conventional thermal batteries have certain drawbacks. These drawbacks include: (1) high self-discharge rates which severely limit their operating lifetime to about one hour or less whereas several hours may be required; (2) keeping the batteries at an operating temperature of greater than 350° C. for extended operating periods of one hour or greater can result in thermal decomposition of the cathode material rendering multihour missions difficult and most likely impossible; and (3) the high powered pulses required dictate a system with minimal internal impedance.

Thermal batteries are made of a number of individual cells which may be stacked one above each other to comprise a bipolar stack. These stacks (if more than one are employed) may be connected in parallel or in series. Each cell of the battery has an equivalent voltage associated with it. Stacking the cells in bipolar fashion allows the voltage of the battery to be adjusted by simply employing the appropriate number of bipolar cells in the cell stack. Each cell consists of an anode, a cathode and a separator which separates the anode material from the cathode material. The cell electrodes contain an electrolyte, typically a mixture of alkali metal halide salts, which is a liquid at the battery operating temperature.

As a thermal battery is heated to operating temperature, the electrolyte melts. The melting point of the electrolyte depends upon the particular material used. Below the electrolyte melting point, the battery is benign and no power can be drawn from it. Typically, the lowest melting point electrolyte that is used melts in the range of 310°-320° C. In many applications of thermal type batteries, such as sonobuoys, the battery must become active in a very short period of time.

In order to raise typical thermal batteries to the operating temperature, a pyrotechnic wafer is placed between each cell. The addition of a pyrotechnic wafer between each cell increases the overall length of the cell stack because for every cell a pyrotechnic wafer of substantial thickness is provided. The pyrotechnic is sized and the composition is selected so as to obtain the correct amount of heat required. A typical pyrotechnic formulation is composed of roughly 88% iron powder and roughly 12% potassium perchlorate. An electric fuse strip is connected to the pyrotechnic wafers and when an electrical signal is sent to activate the battery the electrical signal ignites the pyrotechnics and they burn very quickly. The heat from the burning pyrotechnic flows up into the cells that are adjacent to the heat pellets and very rapidly melts the electrolyte and the battery is energized. After the pyrotechnic is burned, an iron biscuit remains between the cells which contributes to the overall cell stack resistance.

Conventional thermal batteries use iron disulfide as the cathode material. Solubility of the iron disulfide in the electrolyte can result in loss of battery performance. When using a lithium bromide-lithium fluoride-potassium chloride eutectic electrolyte, self-discharge and/or thermal decomposition can be rapid and full performance after one hour at the operating temperature is difficult. Use of an all lithium electrolyte, such as lithium chloride-lithium bromide-lithium fluoride which melts at around 450° C. and operate at 480° C., does not result in favorable operating performance. While the higher temperature supports high power, this combination of temperature and electrolyte composition is unfavorable for iron disulfide stability and, therefore, premature loss of battery life occurs.

Dissolution and/or decomposition of the iron disulfide is essentially a loss of active battery material, and thus represents a loss of battery capacity. Soluble iron disulfide or elemental sulfur released via thermal decomposition react with the lithium anode, thus discharging the battery.

Many emerging applications require the battery to operate for over an hour and the iron disulfide in conventional thermal batteries can undergo significant self-discharge and/or thermal decomposition in one hour. To make up for that loss of electrical generating capability, more active material must be built in to the battery. The additional active material adds more weight, more volume and more cost. Also, more active material requires the addition of even more pyrotechnic. Typically, sonobuoys are configured such that the length to diameter ratios that are available do not allow for excessively long battery stacks. Therefore, a battery design that better utilizes the available outer peripheral dimension of the battery volume is needed.

SUMMARY OF THE INVENTION

I provide an improved multicell battery of the type heated to an operating temperature and having a plurality of battery cells stacked in series. Each cell having an anode and a cathode which are separated from one another by a separator. Both the anode and the cathode contain an electrolyte that is liquid at the operating temperature. The multistack battery may have any shape or configuration, however, the preferred cell configuration is generally circular in cross section so that the bipolar stack(s) is generally cylindrical in shape.

The improvements include providing a pyrotechnic heat source around the outer periphery of each cell. The pyrotechnic heat source is configured as a sleeve and surrounds the cells of the cell stack. Since the preferred cell stacks are shaped cylindrically, the sleeve-like pyrotechnic preferably has an annular cross sectional shape. Intercell heat pellets are thus eliminated and replaced with a sleeve-shaped pyrotechnic heat source provided around the outer periphery of the cell stack. The peripherally-located pyrotechnic allows more efficient utilization of the available battery diameter while reducing voltage loss inside the battery during operation by reducing the internal resistance of the cell stack.

Electrical insulation such as a thin layer of thermally conductive aluminum nitride, beryllium oxide, a thin layer of ceramic insulator or glass tape is preferably provided around the cells between the cells and the pyrotechnic. The electrical insulation is preferably sleeve-like in shape.

Thermal insulation is preferably provided the pyrotechnic. The thermal insulation is also preferably fashioned as a sleeve. The preferred thermal insulations are compressed multifoil or peg foil, along with conventional insulations such as Min-K TM produced by Johns-Manville and Microtherm TM made by Microtherm. Each insulation type is placed inside a vacuum enclosure for enhanced insulating effectiveness. Min-K and Microtherm are insulating materials that are known in the industry while peg foil, and compressed multifoil are load bearing structures which are currently under development for advanced applications such as electric vehicles.

A moderating electrolyte such as 21.2 w% LiF-78.8 w% LiCl (mp-501° C.) having a melting point higher than the minimum battery operating temperature (approximately 450° C.) is preferably used as a heat sink to maintain the operating temperature. The moderating electrolyte can be mixed with or placed in close proximity to the pyrotechnic. The interelectrode separator is preferably made of aluminum nitride which has a very high thermal conductivity. It is also preferred to use cobalt disulfide instead of iron disulfide as the cathode material.

These features act to minimize self-discharge, thermal decomposition and maintain the higher operating temperatures necessary to support high power pulsing. The proposed battery design, although particularly advantageous to sonobuoy applications may be utilized to improve the power capabilities of any thermal battery.

Other objects and advantages of the invention will become apparent from a description of certain present preferred embodiments thereof shown in the drawings.

DETAILED DESCRIPTION OF THE PREFERRED EMBODIMENT

Figure 1:
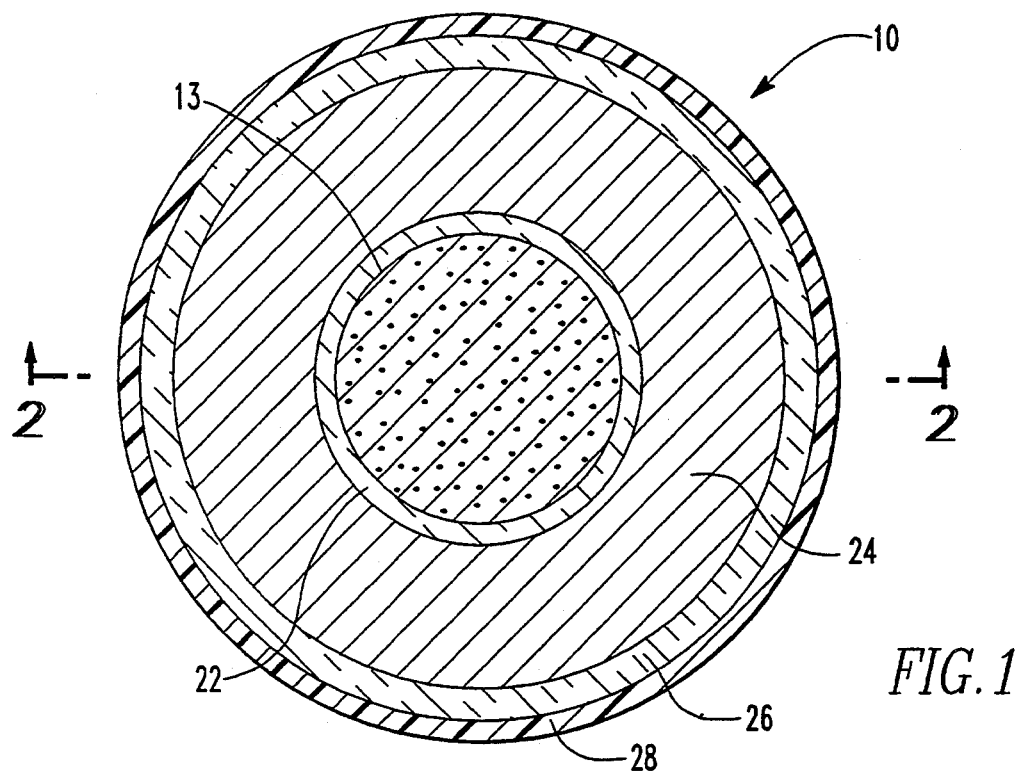
FIG. 1 is a top, cross sectional view of a portion of the preferred improved battery.
Figure 2:
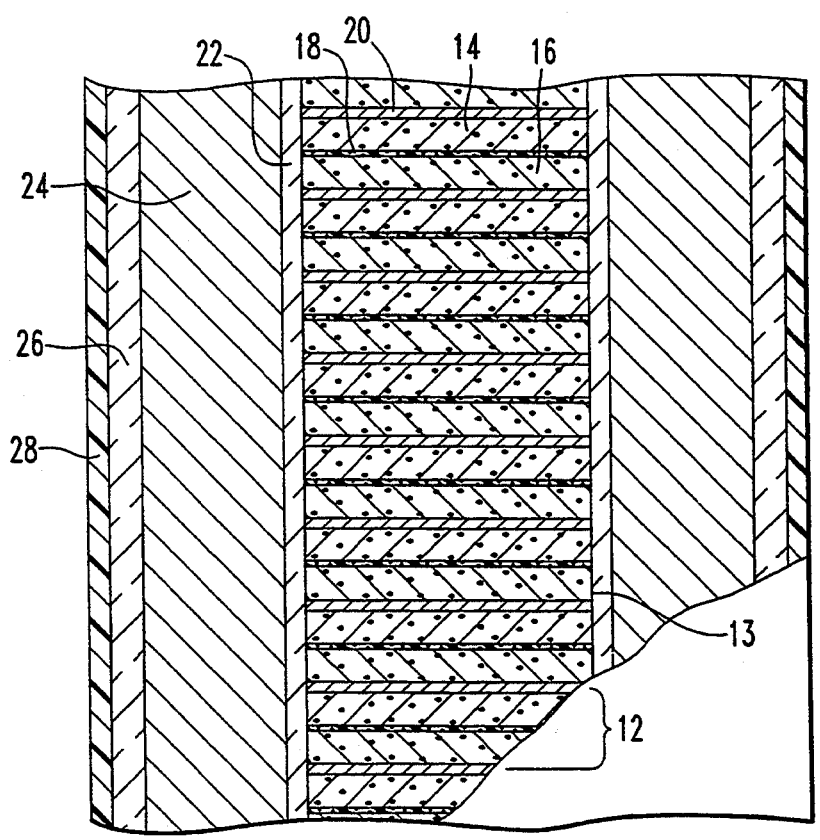
FIG. 2 is a side cross sectional view, partially cut away, taken along line I—I of FIG. 1, of a portion of the preferred improved battery.

An improved multicell battery 10, shown in FIGS. 1 and 2, is the type that is heated to an operating temperature and having a plurality of battery cells 12 stacked one on top of the other. Each cell 12 having an anode 14 and a cathode 16 which are separated from one another by a separator 18. Both the anode 14 and the powdered cathode 16 contain powdered electrolyte that is mixed into both the anode and cathode materials during cell fabrication. The cell stack has an outer peripheral surface 13. Each pair of adjacent cells 12 are separated by a metallic bipolar wall 20. A thin, electrically insulating material 22 is preferably provided around the cells 12.

The battery may be either series stacked or parallel stacked.

It is further preferred that a sleeve-like pyrotechnic heat source 24 be provided around the outer periphery 13 of each cell 12. In this manner, intercell heat pellets may be eliminated by placing the pyrotechnic heat source 24 necessary for heating the entire cell stack up to the full operating temperature and melting the electrolyte around the peripheral outer edges of the cell 12. Thus, the pyrotechnic 24 is provided within the battery structure as a sleeve-like structure sandwiched between the cell stack electrical insulation 22 and the thermal insulating material 26. It is preferred that the sleeve-like structure of pyrotechnic be continuous, however, the pyrotechnic may be formed as a number of separate sections which are each provided around the cell stack.

As can be seen in the figures, the preferred cell stack and preferred battery are generally cylindrical in shape, thus the peripheral surface 13 of the cell stack is preferably circular in cross section. Also, the sleeve-like section of pyrotechnic 24 is preferably annular in cross section having an inner dimension which is preferably an inner diameter and an outer dimension which is preferably an outer diameter. As can be seen in the figures, the inner diameter of the pyrotechnic sleeve is approximately equal to the outer diameter of the cell stack. Likewise, the outer diameter of the pyrotechnic sleeve is approximately equal to the inner diameter of the thermal insulating material 26.

Placing the pyrotechnic 24 on the outside of the cell stack near the peripheral edge 13 of the cell stack, allows more efficient use of the battery diameter that is available (it being understood that the battery cross section need not be circular, but may be square, rectangular or oval-shaped, so that the battery width need not be a diameter). Placing the pyrotechnic heat source 24 around the outer periphery of the cell stack also decreases the resistance (conversely increases the conductivity) of the cell stack so as to reduce voltage loss inside the battery 10 during pulsing. Improvements in the conductivity are obtained in the preferred battery because the cell stack contains only cell components and does not contain pyrotechnic residue which has finite electrical resistance.

Thermally conductive electrical insulation 22 is provided around the cells, between the cells and the pyrotechnic. Examples of some appropriate electrical insulation include a thin layer of aluminum nitride, beryllium oxide, a ceramic insulator, and glass tape. The electrical insulation is provided due to the preferred pyrotechnic being conductive. The electrical insulation may be obviated by the use of a nonconductive pyrotechnic material.

Thermal insulation is then preferably provided around the pyrotechnic. The thermal insulation is preferably fashioned as a sleeve. It is further preferred to place conventional or advanced thermal insulation materials in a high efficiency vacuum closure. The preferred thermal insulating materials 26 are compressed foil, peg foil and Min-K TM or Microtherm TM. By using an insulating material 26 such as a peg foil or compressed multi foil, a load bearing vacuum structure with low loss rates of less than 2 watts per square foot can be produced. Multifoil is a known insulating material which is comprised of alternating layers of a thin metal foil and an insulating material such as fiberglass. The multifoil acts a multiple radiation shield to minimize radiation heat loss. Peg foil is another known insulating material which is comprised of layers of foil separated by peg like structures. The pegs are usually made of ceramic or some other non-heat conducting material and provide some compressive strength to the material to provide load bearing capabilities to the thermal insulation 26. The thermal insulation 26 is preferably placed around the pyrotechnic heat source 24 between the pyrotechnic 24 and the cell/battery casing 28.

Because the cell stack of the presently described invention consists only of cell components, the width of the cell stack may be reduced while still providing battery output equal to or better than the output of a battery having intercell pyrotechnic pellets. By reducing the width of the cell components, the cell components may be heated more efficiently and more rapidly by the surrounding pyrotechnic 24. Also, a reduced cell stack width will also reduce the time needed to activate the cell.

The preferred battery design further utilizes a moderating salt electrolyte such as LiCl-LiF which melts at approximately 500° C. The moderating electrolyte, which may be mixed in with the pyrotechnic 24 is preferably used as a heat sink to maintain the operating temperature and to prevent the operating temperature from overshooting during heat up. The moderating electrolyte thus uses the heat of fusion to buffer the temperature at the melting point of the moderating salt.

The interelectrode separator 18 is preferably made of porous, sintered aluminum nitride. Aluminum nitride has a high thermal conductivity to promote activation and is an effective separator material in that it allows an ionic path between each cell's electrodes while physically separating the electrode material.

It is additionally preferred to replace iron disulfide with cobalt disulfide as the cathode 16 material. Replacing the iron disulfide with cobalt disulfide allows for up to nearly eight hours of stand at 480° C. with little or no loss of pulse power performance.

The proposed battery design is particularly advantageous to sonobuoy applications due to its high rate capabilities, reduced weight and reduced size over state of the art batteries, however, it is distinctly understood that the improved battery design may be utilized to improve the power capabilities of any thermal battery, with particular advantages provided to those batteries operating under high rate conditions.

While the present preferred embodiment of the multistack battery is shown and described as being generally circular in cross section and generally cylindrical in shape, it is distinctly understood that the cell stack and the battery may have any selected cross section and shape. The pyrotechnic will be adapted to surround any selected shape of the cell stack. For example, if the cell stack had a square cross sectional shape, the sleeve-like pyrotechnic would resemble a square picture frame having an inner length and an outer length.

While certain present preferred embodiments have been shown and described, it is distinctly understood that the invention is not limited thereto but may be otherwise embodied within the scope of the following claims.

I claim:

1. An improved battery of the type heated to an operating temperature and having a plurality of stacked cells, each cell having an anode and a cathode separated from one another by a separator, each cell containing an electrolyte, each cell further having an outer periphery, the improvement comprising:
    a sleeve of pyrotechnic heat source provided around the outer periphery of selected cells.

2. The battery of claim 1 wherein the pyrotechnic heat source is fashioned as a continuous sleeve.

3. The battery of claim 1 wherein the pyrotechnic heat source is fashioned as a plurality of sections.

4. The battery of claim 1 wherein the pyrotechnic heat source is provided around the outer periphery of all the cells.

5. The battery of claim 1 wherein the cell stack is cylindrical in shape and the pyrotechnic heat source has an annular cross section.

6. The battery of claim 1 further comprising thermal insulation provided around the cells and pyrotechnic heat source.

7. The battery of claim 6, wherein the thermal insulation is one of compressed multifoil and peg foil.

8. The battery of claim 1 further comprising electrical insulation provided around the cells between the cells and the pyrotechnic heat source.

9. The battery of claim 8 wherein the electrical insulation is one of aluminum nitride, beryllium oxide, ceramic insulation and glass tape.

10. The battery of claim 1 wherein each separator is made of aluminum nitride.

11. The battery of claim 1 wherein each cathode is made of cobalt disulfide.

12. The battery of claim 1 further comprising a moderating electrolyte added to the battery as a heat sink.

13. The battery of claim 12 wherein the moderating electrolyte is one of lithium fluoride and lithium chloride.

14. An improved battery of the type heated to an operating temperature and having a plurality of stacked cells, each cell having an anode and a cathode separated from one another by a separator and containing an electrolyte, each cell further having an outer periphery, the improvement comprising:
    a continuous sleeve of a pyrotechnic heat source provided around the outer periphery of each cell;
    electrical insulation provided around the cells between the cells and the pyrotechnic heat source; and
    thermal insulation provided around the cells and pyrotechnic heat source, wherein the thermal insulation is one of compressed multifoil and peg foils.

* * * * *